United States Patent
Zhao et al.

(10) Patent No.: US 8,852,818 B2
(45) Date of Patent: Oct. 7, 2014

(54) NON-AQUEOUS SECONDARY BATTERY

(75) Inventors: Jinbao Zhao, Ibaraki (JP); Eri Kojima, Ibaraki (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 136 days.

(21) Appl. No.: 13/153,659

(22) Filed: Jun. 6, 2011

(65) Prior Publication Data

US 2011/0236737 A1 Sep. 29, 2011

Related U.S. Application Data

(60) Continuation of application No. 12/776,533, filed on May 10, 2010, now abandoned, which is a division of application No. 11/447,986, filed on Jun. 7, 2006, now Pat. No. 7,829,226.

(30) Foreign Application Priority Data

Jun. 7, 2005 (JP) .................................. 2005-166509
Jun. 7, 2005 (JP) .................................. 2005-166510

(51) Int. Cl.
- H01M 6/16 (2006.01)
- H01M 10/058 (2010.01)
- H01M 4/485 (2010.01)
- H01M 10/0567 (2010.01)
- H01M 4/131 (2010.01)
- H01M 10/0564 (2010.01)
- H01M 4/505 (2010.01)
- H01M 4/525 (2010.01)

(52) U.S. Cl.
CPC ........ *H01M 10/0564* (2013.01); *H01M 10/058* (2013.01); *H01M 4/485* (2013.01); *H01M 10/0567* (2013.01); *H01M 4/525* (2013.01); Y02E 60/122 (2013.01); *H01M 4/131* (2013.01); *H01M 4/505* (2013.01)
USPC ........ 429/340; 429/329; 429/231.1; 429/162; 429/163; 429/164; 429/166; 429/168; 429/176; 429/231.8; 429/231.95; 429/218.1

(58) Field of Classification Search
CPC ....... H01M 4/505; H01M 4/52; H01M 4/525; H01M 4/583; H01M 2/0257; H01M 2/04; H01M 6/166; H01M 6/168; H01M 10/0525; H01M 10/0567; H01M 10/0568; H01M 2004/027; H01M 2004/028; H01M 2300/0025
USPC .............. 429/340, 329, 231.1, 162, 163, 164, 429/166, 168, 176, 231.8, 231.95, 218.1
See application file for complete search history.

(56) References Cited

U.S. PATENT DOCUMENTS

| | | | | |
|---|---|---|---|---|
| 5,780,182 A | * | 7/1998 | Barker et al. | ............... 429/231.8 |
| 5,795,678 A | * | 8/1998 | Takami et al. | ................. 429/209 |
| 6,346,351 B1 | * | 2/2002 | Yde-Andersen et al. | ...... 429/326 |
| 6,413,678 B1 | | 7/2002 | Hamamoto et al. | |
| 6,444,370 B2 | * | 9/2002 | Barker et al. | ................. 429/332 |
| 6,670,078 B1 | | 12/2003 | Sato et al. | |
| 7,261,975 B2 | | 8/2007 | Abe et al. | |
| 7,419,747 B2 | | 9/2008 | Utsugi et al. | |
| 7,608,364 B2 | * | 10/2009 | Nishiyama et al. | ........... 429/340 |
| 7,781,106 B2 | | 8/2010 | Abe et al. | |
| 2003/0054259 A1 | | 3/2003 | Murai et al. | |
| 2003/0152839 A1 | | 8/2003 | Kawai et al. | |
| 2004/0142245 A1 | * | 7/2004 | Ishikawa et al. | ......... 429/231.95 |
| 2005/0186481 A1 | | 8/2005 | Ogawa et al. | |
| 2006/0292452 A1 | | 12/2006 | Utsugi et al. | |
| 2007/0015063 A1 | | 1/2007 | Ogawa et al. | |
| 2007/0072086 A1 | | 3/2007 | Nakagawa | |
| 2007/0082271 A1 | | 4/2007 | Abe et al. | |
| 2007/0154815 A1 | | 7/2007 | Kawasaki et al. | |

FOREIGN PATENT DOCUMENTS

| | | | |
|---|---|---|---|
| JP | 9-245834 A | | 9/1997 |
| JP | 11-354156 | * | 12/1999 |
| JP | 3213459 B2 | | 7/2001 |
| JP | 2003-59529 A | | 2/2003 |
| JP | 2003-151623 A | | 5/2003 |
| JP | 3438636 B2 | | 6/2003 |
| JP | 2003-308875 A | | 10/2003 |
| JP | 2004-22523 A | | 1/2004 |
| JP | 2004-47413 A | | 2/2004 |
| JP | 2004-355974 A | | 12/2004 |
| JP | 3658506 B2 | | 3/2005 |
| JP | 2005-203342 A | | 7/2005 |
| JP | 3760540 B2 | | 1/2006 |
| JP | 2006-140115 A | | 6/2006 |
| WO | WO 03/105268 A1 | | 12/2003 |
| WO | WO 2004/102700 A1 | | 11/2004 |
| WO | WO 2005/015677 A1 | | 2/2005 |
| WO | WO 2005/029631 A1 | | 3/2005 |
| WO | WO 2005/048391 A1 | | 5/2005 |

OTHER PUBLICATIONS

Japanese Office Action mailed on Oct. 19, 2010 in Japanese Patent Application No. 2005-166509.

* cited by examiner

*Primary Examiner* — Laura Weiner

(74) *Attorney, Agent, or Firm* — Birch, Stewart, Kolasch & Birch, LLP

(57) ABSTRACT

A non-aqueous secondary battery contains a positive electrode, a negative electrode, a separator and a non-aqueous electrolytic solution. The positive electrode contains a layered structure lithium-containing compound oxide, or a spinel lithium-containing compound oxide containing manganese as an active material. The non-aqueous electrolytic solution contains at least one additive selected from a sulfonic acid anhydride, a sulfonate ester derivative, a cyclic sulfate derivative and a cyclic sulfonate ester derivative, and a vinylene carbonate or a derivative of the vinylene carbonate.

6 Claims, 2 Drawing Sheets

NON-AQUEOUS SECONDARY BATTERY

This application is a Continuation of application Ser. No. 12/776,533 filed on May 10, 2010 and now presently abandoned, which was a Divisional of application Ser. No. 11/447,986, which is filed on Jun. 7, 2006, and is now U.S. Pat. No. 7,829,226, the entire contents of which are hereby incorporated by reference and for which priority is claimed under 35 U.S.C. §120. application Ser. No. 11/447,986 claims priority based on Japanese Patent Applications Nos. 2005-166509 and 2005-166510 both filed on Jun. 7, 2005, the contents of which are herein incorporated by reference in their entirety.

BACKGROUND OF THE INVENTION

1. Field of the Invention

The present invention relates to a secondary battery having a non-aqueous electrolytic solution with a high voltage, high battery capacity and, an excellent property of charging/discharging cycle, etc.

2. Description of the Related Art

A lithium-ion secondary battery has been used, for example, in the field of portable information devices, since the battery has advantageous properties such as a high voltage (operating voltage 4.2V), high energy density, and further the demand for the battery is being increased rapidly. Nowadays, a lithium-ion secondary battery is the most popular battery for portable information devices such as a cellular phone and a laptop computer. Needless to say, as such devices are getting higher performance and more functions, it is also desired that a lithium-ion secondary battery as a power source have a higher ability (e.g., a higher capacity and a higher energy density). Varieties of technologies were proposed so as to meet this demand. For example, developments such as improvement of density with an improved filling rate of an electrode, increasing the depth of charge of an active material (especially, a negative electrode) and a new active material with high capacity, were proposed. A lithium-ion secondary battery was actually improved utilizing these technologies.

Hence, in order to attain a higher capacity, it is desired to improve an efficiency of a positive electrode active material and to develop a new high voltage material. Among them, it is brought to attention that a depth of charge of a positive electrode active material is improved by, especially, increasing a charging voltage. For example, with respect to cobalt compound oxide (LiCoO$_2$) used as an active material for a lithium-ion battery of the 4.2V class of an operating voltage, when charging is conducted to 4.3V, with reference to a potential of Li, charging capacity is about 155 mAh/g; when being charged to 4.50V, charging capacity is about 190 mAh/g or higher. Because of such an improvement in the charging voltage, efficiency of a positive electrode active material can be improved.

However, while the capacity and an energy density of a battery are improved with higher voltage, safety and a charging/discharging cycle property of a battery tend to be lowered and further technical problems such as expansion of a battery during storage at high temperature arose.

Conventionally, the same technologies for solving such problems (e.g., the safety of a battery, low charging/discharging cycle properties and expansion of battery) were proposed. For example, in most lithium-ion secondary batteries available in the marketplace, a non-aqueous electrolytic solution includes a solvent mixture mainly composed of cyclic ester such as ethylene carbonate and linear esters such as dimethyl carbonate, diethyl carbonate and ethyl methyl carbonate. It was proposed that additives such as cyclic sulfuric esters were added to a non-aqueous electrolytic solution so as to solve the above-mentioned problems of a lithium-ion secondary battery (Japanese Patent No. 3760540, Japanese laid open No. 2003-151623, Japanese laid open No. 2003-308875, Japanese laid open No. 2004-22523, Japanese Patent No. 3658506, Japanese Patent No. 3213459, Japanese Patent No. 3438636, Japanese laid open No. 9-245834, etc.).

Where a lithium-ion secondary battery, which has a non-aqueous electrolytic solution containing the additives, is charged, a dense protective film derived from the additives is formed on a surface of a negative electrode. The film continuously prevents the negative electrode from being reacted with the organic solvent in the non-aqueous electrolytic solution. Thus, after the film is formed, deterioration of battery capacity with the proceeding of charging/discharging cycle and expansion of a battery caused by gas generated in a battery can be suppressed, and a charging/discharging cycle property of battery can be improved.

Further, it is proposed that cyclic sulfone derivatives and acid anhydrides are added to non-aqueous electrolytic solution of a secondary battery such as a lithium-ion secondary battery and a primary battery so as to suppress an expansion of a battery caused by gas generated in a battery and then to provide a battery suitable for use at high temperature atmosphere. (Japanese laid open No. 2004-47413).

However, since these technologies do not provide any consideration to the technical issue in the case where an electric potential of a positive electrode can be a high voltage such as 4.35V or higher with reference to a potential of Li when a battery was fully charged, it is not sufficient to simply apply these technologies to the battery with a high voltage so as to suppress deterioration of a charging/discharging cycle character and an expansion of a battery during storage at high temperature of secondary battery.

SUMMARY OF THE INVENTION

In the present invention, for example, a non-aqueous secondary battery includes a positive electrode, a negative electrode, a separator and a non-aqueous electrolytic solution, wherein the positive electrode contains a layered structure lithium-containing compound oxide containing manganese or a spinel lithium-containing compound oxide containing manganese as an active material, the non-aqueous electrolytic solution contains at least one additive selected from the group consisting of: a sulfonic acid anhydride expressed by the general formula (1); a sulfonate ester derivative expressed by the general formula (2); a cyclic sulfate derivative expressed by the general formula (3); and a cyclic sulfonate ester derivative expressed by the general formula (4), and a vinylene carbonate or a derivative of the vinylene carbonate, as follows:

(1)

(2)

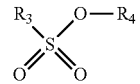

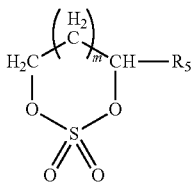

(3)

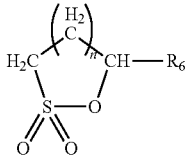

(4)

wherein each of $R_1$ and $R_2$ in the general formula (1) represents independently a organic residue having 1-10 of carbon atoms, each of $R_3$ and $R_4$ in the general formula (2) represents independently a organic residue having 1-10 of carbon atoms, $R_5$ in the general formula (3) represents independently hydrogen or alkyl group having 1-4 of carbon atoms, which can have a fluorinated substituent, n is 0 or 1, and $R_6$ in the general formula (4) represents independently hydrogen or alkyl group having 1-4 of carbon atoms, which can have a fluorinated substituent, m is 0, 1 or 2.

DESCRIPTION OF THE PREFERRED EMBODIMENTS

Figure 1:
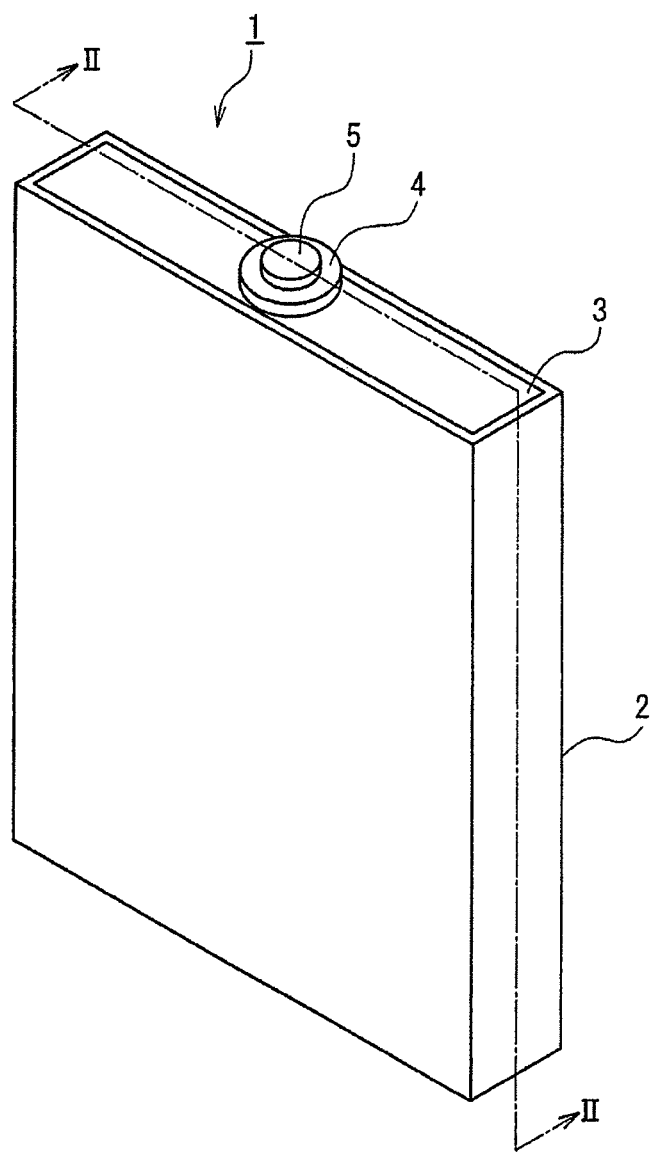
FIG. 1 is a perspective external view of one embodiment of the non-aqueous secondary battery of the present invention.

In a non-aqueous secondary battery charged with high voltage, metal oxide used as positive electrode active material has a strong oxidizing property under the condition of high electric potential, the metal oxide reacts with and decomposes an organic solvent of non-aqueous electrolytic solution at a surface of a positive electrode After intensive research, the inventors found that such decomposition reaction of solvent of a non-aqueous electrolytic solution causes deterioration of the charging/discharging cycle property and an expansion of a battery during storage at high temperature, with respect to a non-aqueous secondary battery charged to high voltage. Further, it has been found that when a specific positive electrode containing a lithium-containing compound oxide as a active material, and non-aqueous electrolytic solution containing at least one additive selected from sulfonic acid anhydrides, sulfonate ester derivatives, cyclic sulfuric ester derivatives and cyclic sulfonate ester derivatives which have a specific structure and a vinylene carbonate or its derivatives are employed together, decomposition reaction of solvent of non-aqueous electrolytic solution can be suppressed in a non-aqueous secondary battery charged to high voltage, thereby charging/discharging cycle property and storage property at high temperature of a non-aqueous secondary battery used at high voltage can be improved. Further, the inventors successfully have also improved safety of a battery at the overcharged state and reached the present invention.

In a non-aqueous secondary battery of the present invention, electric potential of positive electrode at having been charged can be 4.35V or higher with reference to a potential of Li. In the battery of the present invention, efficiency of positive electrode active material is increased by increasing an electric potential of positive electrode at charging, and thereby the battery capacity is improved. There is no particular limitation on the upper limit of an electric potential of positive electrode at charging. The upper limit of an electric potential of a positive electrode can be determined according to a stability of active material, voltage resistance property of a collector (specifically described below) and a solvent of non-aqueous electrolytic solution. In generally, it is preferably 4.6V or less, more preferably 4.5V or less with reference to a potential of Li. An open-circuit voltage of non-aqueous secondary battery can be determined according to combination of an electric potential of a positive electrode and an electric potential of a negative electrode. For example, in a battery having a negative electrode of carbon material having high degree of crystallinity, when positive electrode electric potential is 4.35V with reference to a potential of Li, an open-circuit voltage of the battery can be about 4.25V. Namely, a difference between an electric potential of a positive electrode and an open-circuit voltage of a battery is about 0.1V.

In the present invention, "an electric potential of a positive electrode when charging is conducted" means that an electric potential of a positive electrode at the condition where a battery is charged up to a designed electric capacity, so-called "full charge".

In the present invention, a positive electrode can be obtained, for example, according to the following method. A conductive assistant and a binder such as polyvinylidenefluoride are added to a positive electrode active material and the thus obtained mixture is dissolved or dispersed in solvent such as N-methyl-2-pyrrolidone (NMP) so as to obtain a mixture containing a paste or a slurry containing a positive electrode active material (the composition containing a positive electrode active material). The composition containing a positive electrode active material is coated on one or both sides of a collector such as an aluminum foil, followed by removing solvent. Further, the foil is formed so as to obtain a strip-shaped positive electrode (the layer of the composition containing a positive electrode active material). However, there is no particular limitation on a method for obtaining a positive electrode.

As positive electrode active material, a lithium-containing compound oxide that contains Mn and has a layered structure or a spinel structure can be employed. Further, the lithium-containing compound oxide is also capable of intercalation and deintercalation of lithium.

Examples of the lithium-containing compound oxide having Mn element and layered structure (hereinafter sometimes referred to as "layered structure lithium manganese composite oxide") include, lithium manganese nickel cobalt compound oxide, which further contains Ni and Co, and lithium-containing compound oxide where Mn and Ni are contained at ratio of 1:1, and a part of Mn and Ni elements are substituted with Co, Al, Ti, Zr, Mg, etc. More specifically, lithium-containing compound oxides having a structure such as $Li_xNi_{1/3}Mn_{1/3}Co_{1/3}O_2$, $Li_xNi_{5/12}Mn_{5/12}Co_{1/6}O_2$, and $Li_xNi_{1/3}Mn_{1/3}Co_{1/3-t}Zr_tO_2$ (in these formulas, $0<x\le1.1$, $0<t\le0.1$) are preferably used.

Examples of a lithium-containing compound oxide which contains Mn and has spinel structure (hereinafter sometimes referred to as "spinel lithium manganese composite oxide") include lithium-containing compound oxides having a structure such as $Li_yMn_2O_4$ ($0.98<y\le1.1$) and the lithium-containing compound oxide, where a part of the Mn elements is substituted with at least one selected from Ge, Zr, Mg, Ni, Al and Co (e.g., $LiCoMnO_4$ and $LiNi_{0.5}Mn_{1.5}O_4$).

The layered structure lithium manganese composite oxide and the spinel lithium manganese composite oxide can be used singly, or two or more of such oxides can be used in combination. Further, more than one kind of the layered structure lithium manganese composite oxides and more than one kind of the spinel lithium manganese composite oxide can also be used in combination.

Further, with respect to the positive electrode active material, other active material capable of intercalation and deintercalation of lithium can also be used together with the layered structure lithium manganese composite oxide and the spinel lithium manganese composite oxide. Examples of such active materials include the layered structure and the spinel lithium-containing compound oxide, represented by formulas such as $Li_xMO_2$ and $Li_yM_2O_4$ (M is a transitional metal other than Mn, x and y are in the range of $0<x\leq1.1, 0\leq y\leq2.1$), spinel-type oxides, and metal chalcogen compounds having layered structure. More specific examples include lithium-containing compound oxides having layered structures (e.g., $Li_xCoO_2$); the lithium cobalt compound oxide having layered structure, where a part of Co elements is substituted with Al, Ge, Ti, Zr, Mg, Mo, etc; lithium-containing compound oxides having layered structures (e.g., $Li_xNiO_2$); the lithium nickel compound oxide having layered structure where a part of the Ni elements are substituted with Co, Ge, Ti, Zr, Al, Mg, Mo, etc.; lithium titanium compound oxides having structures such as $Li_{4/3}Ti_{5/3}O_4$; metal oxide such as manganese dioxide, vanadium pentoxide and chromium oxide; and metal sulfide such as titanium disulfide and molybdenum disulfide. Two or more of such oxides can be used in combination or be combined for use. Among them, a lithium cobalt compound oxide of layered structure containing at least one of Al, Ge, Ti, Zr, Mg, or Mo is preferably employed.

In the present invention, with respect to the positive electrode, a content of the layered structure lithium manganese composite oxide or the spinel lithium manganese composite oxide (when both of the layered structure and the spinel lithium manganese composite oxides are employed, the total content of both the composite oxides) is preferably 10 mass % or more, more preferably 20 mass % or more, still more preferably 25 mass % or more, based on total amount of the positive electrode active material. Further, the positive electrode active material may be composed of only the layered structure lithium manganese composite oxide and/or the spinel lithium manganese composite oxide (i.e. 100 mass %). When the content of the layered structure lithium manganese composite oxide and the spinel lithium manganese composite oxide is 10 mass % or more based on total amount of the positive electrode active material, the battery has more preferable results.

With respect to a composition of the positive electrode at the positive electrode, for example, it is preferable that a content of positive electrode active material is 90-98 mass %, a content of a conductive assistant is 1-5 mass % and a content of binder is 1-5 mass % based on the layer of the composition containing a positive electrode active material at the positive electrode.

When the layered structure lithium manganese composite oxide or the spinel lithium manganese composite oxide are employed for the positive electrode, even if a battery is charged to 4.35V of the electric potential or higher, the active material is stable structurally and thermally at room temperature (e.g., 25° C.). However, when a battery is charged so that the positive electrode is a high electric potential, if the battery is kept at high temperature (i.e. 60° C. or higher), because of reaction of a positive electrode active material with non-aqueous electrolytic solution solvent, Mn of a positive electrode active material is dissolved in a non-aqueous electrolytic solution and deposits on the surface of a negative electrode. Because of such a reaction, gas is generated in the battery, activity of a negative electrode is lowered, the battery swells and properties (e.g., charging/discharging cycle) tend to be deteriorated. Thus, it is desired that storage property at high temperature of a battery be further improved.

In the present invention, at least one additive selected from the group consisting of a sulfonic acid anhydride represented by the general formula (1) shown below, a sulfonate ester derivative represented by the general formula (2) shown below, a cyclic sulfate derivative represented by the general formula (3) shown below and a cyclic sulfonate derivative represented by the general formula (4) are contained in non-aqueous electrolytic solution, and thereby reaction of a positive electrode active material and non-aqueous electrolytic solution at the surface of the positive electrode is controlled, and dissolution of Mn from positive electrode active material, deposition of Mn, which is eluted from the positive electrode active material, at the surface of the negative electrode can be suppressed effectively.

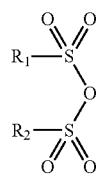
(1)

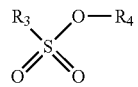
(2)

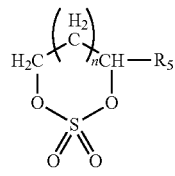
(3)

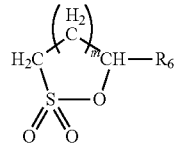
(4)

In the present invention, when a vinylene carbonate and/or a derivative thereof are further contained in the electrolyte, reduction and decomposition solvents of non-aqueous electrolytic solutions at the negative electrode are effectively suppressed, thereby expansion of the battery is suppressed, and an excellent storage property at high temperature of a non-aqueous secondary battery can be attained.

The above-mentioned vinylene carbonate and its derivative can prevent a solvent of non-aqueous electrolytic solution from being reduced and decomposed at the negative electrode. However, it is difficult to suppress sufficiently the reaction of solvent at a negative electrode in the conventional battery, since solvent of non-aqueous electrolytic solution is reacted with positive electrode active material and decomposed when an electric potential of a positive electrode active material is 4.3V or more, gas generated by the decomposition tend to cause the increase of the internal pressure of a battery. Especially, when a carbon material having a high crystallinity (e.g., graphite) is employed, it is not easy to control such a reaction at the negative electrode, since a negative electrode negative electrode has electrochemically a stronger reducing ability non-aqueous electrolytic solution solvent is easily reduced and decomposed at the surface of the negative electrode.

However, in the battery of the present invention, vinylene carbonate and its derivative are sufficiently prevented from being reacted with the positive electrode active material and oxidative-decomposed, since the above mentioned additives are contained in the non-aqueous electrolytic solution.

Accordingly, in the present invention, not only is a reaction of electrolyte solvent at positive electrode suppressed, but also a reaction of the solvent at the negative electrode is controlled. Thus, for example, a deterioration of properties during storage at high temperature is effectively suppressed, and such a result is preferable to especially a battery having negative electrode of graphite. Thus, a battery of the present invention is dependable.

Gas generated at the initial charging can cause problems, but which do not likely need to be realized at the initial charging. A battery case can be sealed after gas generated at the initial charging has been expelled out of a battery so as to avoid such a problem.

After a non-aqueous electrolytic solution is poured through an opening (e.g., inlet) of a battery case, charging can be conducted, leaving the inlet open. According to this manner, gas generated at the charging can be expelled out of a battery case. However, in order to prevent water from coming into the battery case through the inlet, it is preferred that the charging is conducted in a dry room where the dew point is −30° C. or lower.

Alternately, after a non-aqueous electrolytic solution is poured through an inlet of a battery case, charging can be conducted with the inlet closed temporally, and then the inlet is opened after the charging is completed so as to expel the gas, followed by closing the inlet tightly. In this manner, it is also preferred that the charging is conducted in the dry room.

There is no particular limitation on methods for expelling gas out of a battery case. The gas can be released either naturally using pressure difference between inside and outside of a battery case, or compulsorily vacuuming the gas (e.g., reducing a pressure outside of the case battery).

With respect to a amount of charge, it is preferred that the battery is charged to 5% or more of the designed capacity, 10% or more is more preferable, 20% or more is still more preferable. There is no particular limitation with respect to the upper limit of the amount of charge. The battery can charged to 100% of the designed capacity of the battery (so-called "full charged").

There is no particular limitation with respect to the charging time and the charging current for the battery as far as the above-mentioned amount of charge is obtained. However, it is usually preferred that the battery is charged with small current (e.g., 0.5 C or lower) for a long time. Further, it is more preferred to charge the battery with 0.3 C or lower of current.

It is preferred that 0.2 mass % or more of the vinylene carbonate and its derivative is contained, based on the total amount of the non-aqueous electrolytic solution. The content of the vinylene carbonate and its derivative is more preferably 0.3 mass % or more, based on the total amount of the non-aqueous electrolytic solution. Further, it is preferred that 5 mass % or less of the vinylene carbonate and its derivative is contained, based on the total amount of the non-aqueous electrolytic solution. The content of the vinylene carbonate and its derivative is more preferably 3 mass % or less, based on the total amount of the non-aqueous electrolytic solution.

Examples of the derivative of vinylene carbonate include 4,5-dimethyl vinylene carbonate, 4,5-diethyl vinylene carbonate, 4,5-dipropyl vinylene carbonate, 4-ethyl-5-methyl vinylene carbonate, 4-ethyl-5-propyl vinylene carbonate, 4-methyl-5-propyl vinylene carbonate, and diphenyl vinylene carbonate.

A non-aqueous electrolytic solution of the battery of the present invention is obtained by dissolving an electrolyte salt in organic solvent, which is an electrolyte solvent. Further, non-aqueous electrolytic solution can contain at least one additive selected from a sulfonic acid anhydride, a sulfonate ester derivative, a cyclic sulfate derivative and a cyclic sulfonate ester derivative represented by the general formula (1)-(4), respectively, and vinylene carbonate and/or its derivative. However, there is no particular limitation with respect to the method for preparing non-aqueous electrolytic solution containing these compounds.

The additives work as a modifier for the surface of the positive electrode. Namely, the sulfonic acid anhydride, the sulfonate ester derivative, the cyclic sulfate derivative and the cyclic sulfonate ester derivative are oxidized and form a protective film on the surface of the positive electrode before the positive electrode is reacted with the solvent. Therefore, decomposition on the surface of the positive electrode caused by electrochemical oxidation is suppressed since active spots to a solvent of non-aqueous electrolytic solution on the surface of positive electrode is terminated by the film, and then decrease of properties of charge/discharge cycle and storage property at high temperature of a battery is prevented.

In the general formula (1), which represent a sulfonic acid anhydride, and the general formula (2), which represent a sulfonate ester derivative, $R_1$, $R_2$, $R_3$ and $R_4$ represent independently an organic residue having 1-10 carbons, respectively. $R_1$, $R_2$, $R_3$ and $R_4$ are preferably an alkyl group having 1-10 carbons, in which all or partial hydrogen atoms can be substituted with a fluorine atom. Examples thereof include methyl group, ethyl group, propyl group, isopropyl group, butyl group, and isobutyl group. Further, $R_1$, $R_2$, $R_3$ and $R_4$ can be an aromatic group having 1-10 of carbons. $R_1$, $R_2$, $R_3$ and $R_4$ contain preferably 2 or more carbons, and preferably 6 or less carbons. Further, $R_4$ is more preferably an alkyl group having 1-6 of carbons, or benzyl group having 1-6 carbons. When $R_1$, $R_2$, $R_3$ and $R_4$ are sulfonic acid anhydride or sulfonate ester derivative that have more than 10 carbons, the solubility to a solvent of non-aqueous electrolytic solution tends to be lowered, and thus it may be difficult to attain the desired effect.

Examples of the sulfonic acid anhydride includes a symmetrical anhydride, an asymmetrical anhydride, which is derived from two or more different kinds of acids (a mixed anhydride), and an acid anhydride ester acid anhydride, which has a partial ester as an acid residue. The examples thereof include ethane methane sulfonic acid anhydride, propane sulfonic acid anhydride, butane sulfonic acid anhydride, pentane sulfonic acid anhydride, hexane sulfonic acid anhydride, heptane sulfonic acid anhydride, butane pentane sulfonic acid anhydride, butane ethane sulfonic acid anhydride, butane hexane sulfonic acid anhydride and benzene sulfonic acid anhydride. Sulfonic acid anhydride can be used singly or in combination of more than one kind of the sulfonic acid anhydrides. Among them, propane sulfonic acid anhydride, butane sulfonic acid anhydride, butane pentane sulfonic acid anhydride, pentane sulfonic acid anhydride, and hexane sulfonic acid anhydride are preferable.

Examples of sulfonate ester derivatives include linear alkyl sulfonate esters, such as methyl methanesulfonate, ethyl methanesulfonate, propyl methanesulfonate, isobutyl methanesulfonate, methyl ethanesulfonate, pentanyl methanesulfonate, hexyl methanesulfonate, ethyl ethanesulfonate, propyl ethanesulfonate, isobutyl ethanesulfonate, ethyl propanesulfonate, propyl propanesulfonate, butyl propanesulfonate, methyl butanesulfonate, methyl propanebutanesulfonate, ethyl butanesulfonate, propyl butanesulfonate, methyl pentanesulfonate, ethyl pentanesulfonate, ethyl hexanesulfonate, methyl hexanesulfonate, propyl hexanesulfonate, methyl benzenesulfonate, ethyl benzenesulfonate, propyl benzenesulfonate, phenyl methanesulfonate, phenyl ethanesulfonate, phenyl propanesulfonate, benzyl methanesulfonate, benzyl ethanesulfonate, benzyl propanesulfonate; straight or branched chain alkyl aromatic sulfonate ester, such as methyl benzylsulfonate, ethyl benzylsulfonate and propyl benzylsulfonate; and fluorinated compound of the above-mentioned sulfonate esters. The sulfonate ester derivative can be used alone or in combination of more than one kind of them. Among them, ethyl propanesulfonate, methyl butanesulfonate, ethyl butanesulfonate, methyl pentanesulfonate and ethyl pentanesulfonate are preferable.

In the general formula (3), which represents cyclic sulfate derivative, and the general formula (4), which represents cyclic sulfonate ester derivative, $R_5$ and $R_6$ represents hydrogen or alkyl having 1-4 carbons.

Examples of the alkyl group include methyl group, ethyl group, propyl group, isopropyl group and butyl group. All or a part of hydrogen atoms of the alkyl group can be substituted with fluorine atom.

Examples of the cyclic sulfate derivatives include ethylene glycol sulfuric ester, 1,2-propanediol sulfuric ester, 1,3-propanediol sulfuric ester, 1,2-butanediol sulfuric ester, 1,3-butanediol sulfuric ester, 1,2-pentane diol sulfuric ester, 1,3-pentane diol sulfuric ester, 1,3-hexane diol sulfuric ester, and 1,3-heptane diol sulfuric ester. The cyclic sulfate derivative can be used alone or in combination of more than one of them. Among them, ethylene glycol sulfuric ester, 1,2-propanediol sulfuric ester, 1,3-propanediol sulfuric ester is preferable.

Further, examples of the above-mentioned cyclic sulfonate ester derivative include 1,3-propane sultone, 1,2-propane sultone, 1,2-butane sultone, 1,3-butane sultone, 1,4-butane sultone and 1,3-pentane sultone. The cyclic sulfonate ester derivative can be used alone or in combination of more than one of them. Among them, 1,3-propane sultone, 1,2-propane sultone and 1,4-butane sultone are preferable.

Sulfonic acid anhydride, sulfonate ester derivative, cyclic sulfate derivative and cyclic sulfonate ester derivative can be used alone or in combination of more than one of them. When either sulfonic acid anhydride or cyclic sulfonate ester derivative and cyclic sulfate derivative is mixed, or, sulfonic acid anhydride and cyclic sulfonate ester derivative are mixed, better results sometimes can be attained, compared to the case where the additive is used alone.

A content of the above-mentioned additives (all additives contained in the non-aqueous electrolytic solution when more than one of the additives are employed) is preferably 0.2 mass % or more, more preferably 0.3 mass % or more based on total amount of the non-aqueous electrolytic solution in the battery. Further, the content is also preferably 5 mass % or less, more preferably 3 mass % or less based on total amount of the non-aqueous electrolytic solution in the battery. However, when sulfonic acid anhydride is employed, a content thereof is preferably 2 mass % or less, more preferably and 1 mass % or less. When the content of the additives in the non-aqueous electrolytic solution is too low, the properties (e.g., safety, charging/discharging cycle property and storage property at high temperature) may not be improved effectively. On the other hand, when the content is too high, it tends to be difficult for a high performance battery to be obtained since a film layer, caused by the reaction at the positive electrode and the negative electrode, is formed thicker and thereby the electric resistance is increased.

It is preferred that the organic solvent used in non-aqueous electrolytic solution has a high dielectric constant. For example, ethers and esters are preferably usable. Ethers having a dielectric constant or 30 higher are preferable. Example of the esters having such a high dielectric constant include ethylene carbonate, propylene carbonate, butylene carbonate, γ-butyrolactone, sulfur esters such as ethylene glycol sulphite. Cyclic ester can be preferably used. Among them, cyclic carbonate such as ethylene carbonate, propylene carbonate, butylene carbonate can be more preferably used.

Solvents other than the solvents mentioned above can also be employed. For example, straight or branched chain carbonate such as dimethylcarbonate, diethyl carbonate, methyl ethyl carbonate; straight or branched chain alkyl esters such as methyl propionate; straight or branched chain phosphate triesters such as phosphate trimethyl; and nitrile solvent such as 3-methoxy propionitrile, can be used.

As electrolyte salt used for the non-aqueous electrolytic solution, perchlorate of lithium, organoboron lithium salt, imide salt, and salt of fluorine compound such as triifluoro methanesulfonate are preferably employed. Examples of electrolyte salts include $LiClO_4$, $LiPF_6$, $LiBF_4$, $LiAsF_6$, $LiSbF_6$, $LiCF_3SO_3$, $LiC_4F_9SO_3$ $LiCF_3CO_2$, $Li_2C_2F_4(SO_3)_2$, $LiN(CF_3SO_2)_2$, $LiC(CF_3SO_2)_3$, $LiC_nF_{2n+1}SO_3(n \geq 2)$, and $LiN(Rf_3OSO_2)_2$ (Rf represents fluoro alkyl group). These compounds can be used alone or in combination of more than one of them. Among them, $LiPF_6$ and $LiBF_4$ can be preferably employed from the viewpoint of the better property of charging and discharging.

There is no limitation with respect to the concentration of electrolyte salt of the non-aqueous electrolytic solution. The content is preferably 0.5 mol/L or more, more preferably 0.8 mol/L or more, and preferably 1.7 mol/L or less, more preferably 1.2 mol/L or less.

In the present invention, any non-aqueous secondary battery having the positive electrode and the non-aqueous electrolytic solution can be employed. There is no particular limitation with respect to the other requirements. Any other elements or technologies including conventional art for non-aqueous secondary batteries can also be employed in the present invention unless otherwise explained.

Specifically, there is no particular limitation with respect to a negative electrode of non-aqueous secondary battery of the present invention. Negative electrodes used in the conventional non-aqueous secondary batteries can also be employed. For example, a conductive material and a binder such as polyvinylidene-fluoride and styrene-butadiene rubber can be added to the negative electrode active material, if necessary, followed by dissolving or dispersing them in solvent such as water so as to obtain a paste or a slurry containing a negative electrode active material (the composition containing a negative electrode active material). The composition containing a negative electrode active material is coated on one or both sides of collector such as copper foil, followed by removing the solvent and forming it in a strip-shape (the layer of the composition containing a negative electrode active material). Thus obtained parts can be used as a negative electrode. However, the method for preparing a negative electrode is not limited to these methods. There is no particular limitation with respect to the method for preparing a negative electrode.

As a negative electrode active material, materials capable of intercalation and deintercalation of lithium are usable. For example, carbon materials such as graphite, pyrolytic carbons, cokes, glassy carbons, a pyrolyzed substance of an organic high molecule compound, mesocarbon micro beads, carbon fibers, active carbon; metal composed of an element which forms a lithium metal alloy (e.g., Si and Sn); or metal alloy containing such an elements can be employed.

Among the negative electrode active material, graphite having 0.340 nm or less of interlayer distance $d_{002}$ of lattice plane (002), metal composed of an element capable of alloying with lithium or metal containing such an element can be preferably employed. Especially, graphite having 0.337 nm or less of $d_{002}$ can be preferably employed. When such an active material is employed, the capacity of a battery can be enlarged. Although a limitation is not imposed on the lower limits of $d_{002}$, the lower limit can be about 0.335 nm logically.

In the graphite having 0.340 nm or less of $d_{002}$, crystallite size on Lc at the crystallite structure is preferably 3 nm or more, more preferably 8 nm or more, still more preferably 25 nm or more. When the graphite has such Lc, lithium can be intercalated and deintercalated easily. There is no limitation with respect to the upper limits of Lc. However, Lc is usually about 200 nm. The average particle size of the graphite is preferably 3 μm or more, more preferably 5 μm or more, and is also preferably 15 μm or less, more preferably 13 μm or less. Further, the purity of the graphite is preferably 99.9% or higher. The graphite having such properties (i.e. the particle size and the purity) is easily obtained and cost-effective, and thereby the properties of battery are not impaired. A value of $d_{002}$ and Lc of the graphite, described above is determined using X-ray diffraction method.

When a graphite having high degree of crystallinity (e.g., 0.340 nm of $d_{002}$ or smaller) is employed for a negative electrode active material, as described above, non-aqueous electrolytic solution solvent is likely to be reduced and decomposed at the surface of negative electrode. However, vinylene carbonate or its derivative is contained in the non-aqueous electrolytic solution, for example, in the above mentioned amount, the reductive decomposition of the organic solvent is suppressed. Thus, the non-aqueous secondary battery of the present invention has excellent advantages in several properties.

With respect to a component of the layer of the composition containing a negative electrode active material for negative electrode, for example, when a negative electrode active material, for which binders are necessary, is employed, it is preferred that a content of negative electrode active material is 90-98 mass %, and a content of the binders is 1-5 mass %. When a conductive material is employed, the content of conductive material contained in the layer of the composition containing a negative electrode active material is preferably, for example, 1-5 mass %.

In the non-aqueous secondary battery of the present invention, there is no particular limitation with respect to a separator between the positive electrode and the negative electrode, and thus a separator employed in conventional non-aqueous secondary batteries are usable. For example, microporous separator formed by polyolefin resin such as polyethylene and polypropylene can be preferably employed.

Figure 2:
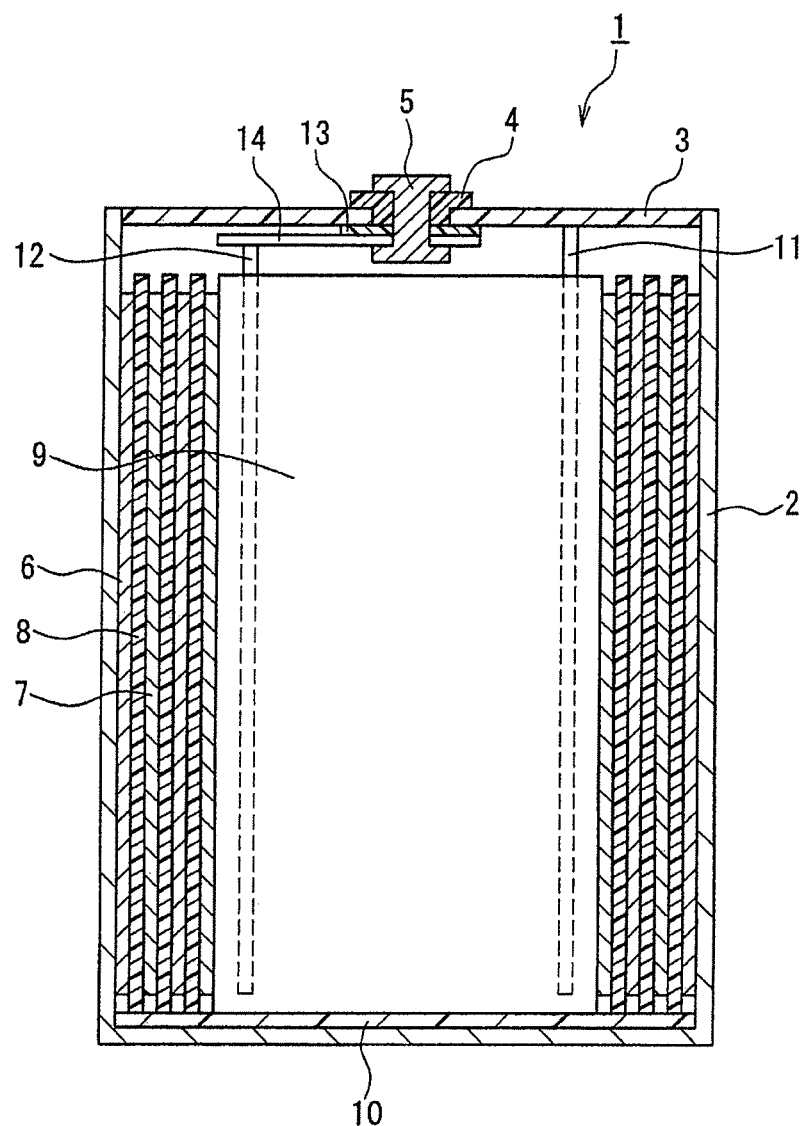
FIG. 2 is a sectional view of FIG. 1 at II-II.

The non-aqueous secondary battery of the present invention is described below in relation to the Figures. The non-aqueous secondary battery shown in the Figures is one embodiment of the present invention. They should not be construed as limiting the scope of the present invention. FIG. 1 is a perspective external view of one embodiment of the non-aqueous secondary battery of the present invention. FIG. 2 is a sectional view of FIG. 1 at II-II. In the description below, the specific explanation about a positive electrode, a negative electrode, a separator, and a non-aqueous electrolytic solution are not provided, since the same positive electrode, negative electrode, separator, and non-aqueous electrolytic solution as explained above can be employed in the battery described below.

In FIG. 1, the non-aqueous secondary battery 1 has a rectangular battery case 2 and sealing plate 3. The battery case 2 can be formed of metal such as aluminum base alloy. The battery case 2 is an outer can of battery, and also a positive electrode terminal. The sealing plate 3 can be used for closing an opening of the battery case 2. The sealing plate 3 can also be formed of a metal such as aluminum base alloy. Further, sealing plate 3 can have a terminal 5, which is formed of, for example, stainless steel, via an insulating gasket 4 formed of a synthetic resin such as polypropylene.

In FIG. 2, the non-aqueous secondary battery 1 has a positive electrode 6, a negative electrode 7 and a separator 8. A positive electrode 6 and a negative electrode 7 having separator 8 between them are wound up in spiral, and pushed down so as to be flattened and obtain an electrode assembly 9 having a flattened spiral structure. Further, the obtained electrode assembly 9 is contained in the battery case 2 with a non-aqueous electrolytic solution. Metal foil (i.e. collector), which is used for preparation of a positive electrode 6 and a negative electrode 7, and non-aqueous electrolytic solution, etc are not shown in FIG. 2 in order to simplify the explanation. Further, in FIG. 2, the inner portion of the electrode assembly 9 is not shown in cross-section diagram.

Further, insulator 10, formed of synthetic resin sheet such as a polytetrafluoroethylene sheet, is disposed at the bottom of the battery case 2. One end of each of a positive electrode lead 11 and a negative electrode lead 12 are electrically connected to each of positive electrode 6 and negative electrode 7 of electrode assembly 9, respectively. The positive electrode lead 11 can be formed of metal such as aluminum and the negative electrode lead 12 can be formed of metal such as nickel. Terminal 5 is connected to a lead plate formed of metal such as stainless steel via an insulator 13 formed of synthetic resin such as polypropylene. The terminal 5 and the sealing plate 3 are insulated front each other using the insulating sealing 4 and the insulator 13.

The sealing plate 3 is inserted to the opening of the battery case 2, and a junction where the sealing plate 3 and the battery case 2 meet is welded, thereby the opening of the battery case 2 is closed and a tightly closed battery is obtained.

In FIG. 2, the positive electrode lead 11 is directly welded to the sealing plate 3, thereby the battery case 2 and the sealing plate 3 works as the positive electrode terminal; negative electrode lead 12 is welded to the lead plate 14 and the negative electrode lead 12 is electrically connected to the terminal 5 via lead plate 14, thereby the terminal 5 has a function of the negative terminal. However, depending on material used for the battery case 2, the negative and the positive may be inverted.

In this explanation about the battery case 2, a rectangular metal case is used. However, for example, a cylindrical metal case, and a laminated case composed a laminated film of metal (e.g., aluminum) and resin can be used.

There is no particular limitation with respect to the method for obtaining the non-aqueous secondary battery 1. However, it is preferred that charging is conducted after the positive electrode 6, the negative electrode 7, the separator 8 and the non-aqueous electrolytic solution is contained in the battery case 2, but before the battery case is sealed tightly. Accordingly, gas generated at initial charging and water remaining in the battery can be removed from the battery case by this charging before sealing the case.

A non-aqueous secondary battery of the present invention has a high voltage and high capacity, and is excellent in safety, a charging/discharging cycle property and a storage property at high temperature. Thus, the non-aqueous secondary battery of the present invention is a suitable secondary battery for not only power sources for portable information equipment such as cellular phones and laptop computers but also various kinds of equipment, because of such excellent properties of the non-aqueous secondary battery.

Hereinbelow, the present invention will be described in more detail with reference to the following Examples and Comparative Examples, which are for illustrative purposes only, and should not be construed as limiting the scope of the present invention or the equivalents encompassed thereby.

Example 1

As explained below, electrodes and a non-aqueous electrolytic solution were prepared, and a non-aqueous secondary battery having the same structure as shown in FIG. 1 and FIG. 2 were produced.

<Preparation of Electrode>

The positive electrode was produced according to the following manner. First, 3 mass parts of carbon black as a conductive material were added to 94 mass parts of $Li_{1.02}Ni_{1/3}Mn_{1/3}Co_{1/3}O_2$ (positive electrode active material), which is layered structure lithium manganese composite oxide and mixed to obtain a mixture. A solution obtained by dissolving 3 mass parts of polyvinylidene-fluoride in NMP is added to the thus obtained mixture and mixed to obtain a slurry of the composition containing a positive electrode active material. The slurry is subjected to sieve using net having 70 mesh to remove large particles. The slurry of the composition containing a positive electrode active material was coated evenly on the surfaces of positive electrode collector of aluminum foil having 15 μm thickness, followed by drying. Subsequently, the thus obtained surfaces of the positive electrode collector were compression-molded using a roll pressing machine to obtain total thickness of 136 μm, and cut. Further, a lead of aluminum was welded thereto to obtain a strip-shaped positive electrode.

A negative electrode was produced according to the following manner. As a negative electrode active material, artificial graphite having high crystallinity obtained in the following manner is prepared. Namely, 100 mass parts of coke powder, 40 mass parts of tar pitch, 14 mass parts of silicon carbide, and 20 mass parts of coal-tar was mixed at 200° C. in air and milled, was subjected to heat treatment in an atmosphere of nitrogen at 1000° C., further heat treatment in an atmosphere of nitrogen at 3000° C. to graphitize, so as to obtain artificial graphite. Thus obtained artificial graphite had 4.0 $m^2$/g of BET specific surface area, and crystallite size 0.336 nm of $d_{002}$, which was determined using a X-ray diffraction method, 48 nm of Lc at the c axis directing and $1 \times 10^{-3}$ $m^3$/kg of total pore volume.

The, thus obtained artificial graphite was used as a negative electrode active material. Styrene-butadiene rubber was used as a binder. Carboxy methyl cellulose was used as a thickening agent. These are mixed in a 98:1:1 mass ratio, and followed by adding water and mixing to obtain a paste of the composition containing a negative electrode active material. The paste containing the composition containing a negative electrode active material was coated evenly on both surface of negative electrode collector of copper foil having 10 μm of thickness and dried. Subsequently, the thus obtained negative electrode collector was compression molded using a roll pressing machine to an obtained 138 μm of total thickness, and cut. Further, lead of nickel was welded thereto to obtain a strip-shaped negative electrode.

<Preparation of Non-Aqueous Electrolyte>

As a non-aqueous electrolytic solution, 1,2-propanediol sulfuric ester as an additive was added to a mixture, where ethylene carbonate (EC), methyl ethyl carbonate (MEC), diethyl carbonate (DEC) and vinylene carbonate (VC) were contained in a 10:10:30:1 volume ratio and $LiPF_6$ was dissolved at concentration of 1.0 mol/L, so as to adjust the content of 1,2-propanediol sulfuric ester to be 2.0 mass % based on the total amount of non-aqueous electrolytic solution. A content of VC contained was 2.1 mass % based on the total amount of the non-aqueous electrolytic solution.

<Preparation of Battery>

The positive electrode was put on the strip-shaped negative electrode via a microporous polyethylene separator (porosity: 41%) a thickness of 20 μm, and wound up in spiral, followed by pressing down to flatten it as to obtain a flat electrode assembly having spiral structure. The thus obtained electrode assembly was fixed with an insulating tape of polypropylene. Subsequently, the electrode assembly was inserted in a rectangular battery case of aluminum base alloy having an external size of 4.0 mm depth thick), 34 mm width 50 mm height, and leads were welded. Further, a sealing plate of aluminum base alloy was welded to the opening of battery case. Subsequently, the non-aqueous electrolytic solution was poured thorough the inlet for an electrolyte formed on the sealing plate, and left for 1 hour. In Example 1, with respect to the non-aqueous secondary battery, when charging was conducted to 4.4V (electric potential of positive electrode is 4.5V with reference to a potential of Li) of designed electric capacity is 820 mAh. With respect to the non-aqueous secondary battery, when charging was terminated upon reaching to 4.2 V (an electric potential of positive electrode is 4.3V with reference to a potential of Li), electric capacity is 720 mAh.

Next, the battery was charged in a dry room having a dew point −30° C. under the following condition. That is, charging was conducted at constant current of 0.25 C (205 mA) for 1 hour so that a amount of charge was 25% (205 mAh) of designed electric capacity of the battery (820 mAh). During the charging, gas generated in the battery was expelled naturally out of the battery through the inlet for electrolyte. After charging was terminated. An inlet for the electrolytic solution was closed so that the battery was tightly sealed. The thus obtained battery was charged at 0.3 C (246 mA) until 4.1V and left at 60° C. for 12 hours. After that, the battery was charged at 0.3 C (246 mA) to 4.4V, and further charged with 4.4V of constant voltage for 3 hour, and then discharged at 1 C (820 mA) to 3V. The thus obtained battery (non-aqueous secondary battery) is used for evaluation.

Examples 2-6

The manner described in Example 1 was repeated to obtain a battery, excepting that, instead of employing 1,2-propanediol sulfuric ester, ethylene glycol sulfuric ester (Example 2), 1,3-propanediol sulfuric ester (Example 3), 1,3-propane sultone (Example 4), 1,2-propane sultone (example 5) and 1,4-butane sultone (Example 6) were employed to prepare a non-aqueous electrolytic solution, respectively, so that each concentration of each additive is 2.0 mass % based on total mass of a non-aqueous electrolytic solution, and that thus obtained non-aqueous electrolytic solution is employed.

Examples 7-13

A manner described in Example 1 was repeated to obtain a non-aqueous secondary battery, excepting that, instead of employing 1,2-propanediol sulfuric ester, 1,3-propane sultone was added to prepare a non-aqueous electrolytic solution, respectively, so that each concentration of 1,3-propane sultone is the mass % shown in Table 3.

Comparative Example 1

A non-aqueous secondary battery was made according to the same manner as Example 1, excepting that 1,2-propanediol sulfuric ester was not added to prepare a non-aqueous electrolytic solution, and the thus obtained non-aqueous electrolytic solution was employed to produce a non-aqueous secondary battery.

With respect to the following properties, each non-aqueous secondary battery obtained in Examples 1-13 and Comparative Example 1 was evaluated. The results are shown in Tables 1-3.

<Storage Property at High Temperature>

Each battery of Examples 1-13 and Comparative Example 1 was charged at 20° C. and 0.5 C (410 mA) up to 4.4V, further charged at 4.4V of constant voltage for 3 hours so as to fully charge the battery, and at this moment thickness of the battery was measured. Subsequently, the battery was discharged at 20° C. and 1 C until reaching 3V, and discharge capacity was evaluated before being subjected to storage. Further, in the Reference Example, using another battery having the same structure as in Example 1, the same evaluation was conducted under the same condition, excepting that only the charging voltage was changed to 4.2V.

Further, after each of the batteries was charged in the same manner as described above, the batteries were kept in a thermostatic chamber at 60° C. for 20 days. After that each battery was cooled naturally to 20° C., and then the thickness of batteries was measured. Expansion of the batteries was obtained by comparing the thickness of the batteries before and after storage.

<Charging/Discharging Cycle Property>

With respect to the batteries, which were not subjected to storage property test at high temperature, of Examples 1-13 and Comparative Example 1, each of the batteries was charged at 20° C. and 0.5 C to 4.4V, and further charged at 4.4V of constant voltage for 3 hours so that the battery was fully charged. And then, charging/discharging cycle, where the battery was discharged at 1 C to 3V, was repeated 200 times, and discharge capacities at 1st cycle and at 200th cycle were measured. Subsequently, using values of the discharge capacities at 1st cycle and at 200th cycle, a retention of capacity was calculated according to the following formula and the charging/discharging cycle property was evaluated.

A retention of capacity (%)=(Discharge capacity at 200th cycle/discharge capacity at 1st cycle)×100

In Reference Example 1, using a battery having the same structure as Example 1, an evaluation was conducted under the same condition as described above, excepting that only the charging voltage was changed to 4.2V.

<Safety Test>

With respect to each battery of Examples 1-13 and Comparative Example 1, each of the batteries, which were not subjected to the above tests, was charged at 20° C. and 0.5 C to reach 4.4 V, further charged at 4.4V of constant voltage for 3 hours so that each battery was fully charged. While the fully charged batteries were furthermore charged to maximum voltage 12V at a current of 1 C and the voltage was kept at 12V for 3 hours, whether each battery had problems (e.g., unusual swelling of the battery case and unusual increase of temperature) was observed, monitoring current value, voltage value and temperature of the battery. Safety test was conducted using 3 batteries in each of the Examples and Comparative Example. In Reference Example 1, using other batteries having the same structure as in Example 1, the safety test was conducted under the same condition excepting that only the charging voltage was changed to 4.2V.

TABLE 1

|  | Charging voltage (V) | Discharge capacity (mAh) | Retention of capacity (%) | Swelling after storage (mm) | Safety (Problem) |
| --- | --- | --- | --- | --- | --- |
| Example 1 | 4.4 | 827 | 89 | 0.24 | Not observed |
| Reference Example 1 | 4.2 | 731 | 92 | 0.21 | Not observed |
| Comparative Example 1 | 4.4 | 829 | 46 | 0.72 | Not observed |

From Table 1, it is realized that the battery of Example 1 has high voltage, high capacity and excellent properties in charging/discharging cycle property (a retention of capacity), storage property at high temperature (swelling after storage), safety (safety at overcharge). On the other hand, in Reference Example 1, where a battery having the same structure as Example 1 was charged at 4.2V of charging voltage, a capacity is smaller, compared with Example 1 where the charging voltage was 4.4V. Further, in a battery of Comparative Example 1, where cyclic sulfuric ester or cyclic sulfonate ester was not added to a non-aqueous electrolytic solution, a retention of capacity is smaller and swelling after storage is larger, such that the properties in charging/discharging cycle property and storage property at high temperature is inferior.

TABLE 2

|  | Additive | Retention of Capacity (%) | Swelling After Storage (mm) | Safety (Problem) |
| --- | --- | --- | --- | --- |
| Example 2 | ethylene glycol sulfuric ester | 87 | 0.28 | Not observed |
| Example 3 | 1,3-propanediol sulfuric ester | 86 | 0.25 | Not observed |
| Example 4 | 1,3-propane sultone | 90 | 0.24 | Not observed |
| Example 5 | 1,2-propane sultone | 86 | 0.27 | Not observed |
| Example 6 | 1,4-butane sultone | 84 | 0.31 | Not observed |

From Table 2, when batteries were built even employing ethylene glycol sulfuric ester (Example 2), 1,3-propanediol sulfuric ester (Example 3), 1,3-propane sultone (Example 4), 1,2-propane sultone (Example 5), 1,4-butane sultone (Example 6) as additive added to non-aqueous electrolytic solution, the battery has substantially the same properties as the battery of Example 1, where non-aqueous electrolytic solution containing 1,2-propanediol sulfuric ester was employed.

TABLE 3

|  | Amount of additive (mass %) | Retention of Capacity (%) | Swelling After Storage (mm) | Safety (Problem) |
| --- | --- | --- | --- | --- |
| Comparative Example 1 | 0 | 46 | 0.72 | Not observed |

TABLE 3-continued

| | Amount of additive (mass %) | Retention of Capacity (%) | Swelling After Storage (mm) | Safety (Problem) |
|---|---|---|---|---|
| Example 7 | 0.2 | 68 | 0.32 | Not observed |
| Example 8 | 0.5 | 81 | 0.29 | Not observed |
| Example 9 | 1 | 89 | 0.23 | Not observed |
| Example 10 | 2 | 90 | 0.24 | Not observed |
| Example 11 | 4 | 85 | 0.22 | Not observed |
| Example 12 | 5 | 78 | 0.27 | Not observed |
| Example 13 | 10 | 55 | 0.45 | Not observed |

From Table 3, when the content of the additive (i.e. 1,3-propane sultone) contained in a non-aqueous electrolytic solution, which was employed for producing a battery, was 0.2 mass % or more, the advantages of the present invention are further clarified. Further, it is also realized that when the content of the additive contained in the non-aqueous electrolytic solution is more than 5 mass %, a retention of capacity (charging/discharging cycle property) and swelling after storage (storage property at high temperature) tend to be lowered. From the fact, it is realized that when a content of the additive contained in a non-aqueous electrolytic solution used in a battery is 0.2 mass % or more (more preferably 0.5 mass % or more) and 5 mass % or less the desired properties are attained.

Examples 14-19 and Comparative Example 2

A non-aqueous secondary battery is obtained in substantially the same manner as Example 1, excepting the use of a mixture of $LiCoO_2$ having a layered structure containing 0.5 mol % of Zr as positive electrode active material and spinel lithium manganese composite oxide ($LiMn_2O_4$) in a ratio shown in Table 4, and a non-aqueous electrolytic solution obtained by adding 1,3-propane sultone and 1,2-propanediol sulfuric ester so that the content of 1,3-propane sultone and 1,2-propanediol sulfuric ester are 0.5 mass % based on total amount of the non-aqueous electrolytic solution, respectively. In Comparative Example 2, a battery has a positive electrode active material containing $LiCoO_2$, but not $LiMn_2O_4$. In Example 14-19, $LiMn_2O_4$ was contained in 10-100 mass % in batteries, respectively. When the battery was charged to 4.4V (electric potential of positive electrode is 4.5V with reference to a potential of Li), the designed electric capacity was determined to be 750 mAh.

Each battery of Examples 14-19 and Comparative Example 2 was evaluated according to the same manner as in Example 1. The results are shown in Table 4.

TABLE 4

| | Content of Lithium Manganese Compound Oxide (mass %) | Retention of Capacity (%) | Swelling After Storage (mm) | Safety (Problem) |
|---|---|---|---|---|
| Comparative Example 2 | 0 | 84 | 0.38 | Observed |
| Example 14 | 10 | 85 | 0.36 | Not observed |
| Example 15 | 20 | 88 | 0.32 | Not observed |
| Example 16 | 30 | 89 | 0.27 | Not observed |
| Example 17 | 50 | 87 | 0.28 | Not observed |
| Example 18 | 80 | 88 | 0.29 | Not observed |
| Example 19 | 100 | 87 | 0.32 | Not observed |

From Table 4, it is clear that the battery of Comparative Example 2, where only lithium cobalt oxide containing Zr was employed for the positive electrode active, has problems and insufficient safety when it was overcharged. On the other hand, the batteries of Examples 14-18, wherein spinel lithium manganese composite oxide was used together with the lithium cobalt oxide, and the battery of Example 19, wherein spinel lithium manganese composite oxide is used, have an excellent retention of capacity (charging/discharging cycle property) and are also excellent in swelling after storage of a battery (storage property at high temperature); and no other problems were observed at overcharge. Thus the battery is dependable. From these facts, it is realized that, when the lithium-containing compound oxide that has the specific structure and contains Mn element is employed as positive electrode active material, a battery that is suitable for charging at high voltage can be obtained, even though other active material is contained. Further, it is also realized that it is preferred that the lithium-containing compound oxide, which has a specific structure and contains a Mn element, is contained at 10 mass % or more based on total amount of positive electrode active material from the viewpoint of battery safety.

Example 20

A non-aqueous secondary battery is obtained in substantially the same manner as Example 1, excepting that instead of employing 1,2-propanediol sulfuric ester, propane sulfonate ethyl and vinylene carbonate were added to prepare a non-aqueous electrolytic solution, respectively, so that concentration of propane sulfonate ethyl and vinylene carbonate 1,3-propane sultone is 1.0 mass % and 2.0 mass % based on the total amount of non-aqueous electrolytic solution, respectively.

Comparative Example 3

A non-aqueous secondary battery is obtained in substantially the same manner as Comparative Example 2, excepting that the electrolyte obtained in Example 20 was employed.

Using the non-aqueous secondary battery obtained in Example 20 and Comparative Example 3, discharge capacity of battery, charging/discharging cycle property, storage property at high temperature and safety were evaluated according to the same manner as described above. In Reference Example 2 shown in Table 5, using another battery having the same structure as the Example 20, several properties were evaluated at 4.2V of charging voltage. The results are shown in Table 5.

TABLE 5

|  | Charging voltage (V) | Discharge capacity (mAh) | Retention of capacity (%) | Swelling after storage (mm) | Safety (Problem) |
| --- | --- | --- | --- | --- | --- |
| Example 20 | 4.4 | 825 | 88 | 0.27 | Not observed |
| Reference Example 2 | 4.2 | 731 | 92 | 0.21 | Not observed |
| Comparative Example 3 | 4.4 | 824 | 91 | 0.26 | Observed |

From Table 5, similar to results of Example 1, it is realized that the battery of Example 20 has high voltage, high capacity and excellent properties in charging/discharging cycle property, storage property at high temperature and safety.

On the other hand, in Reference Example 2, where a battery having the same structure as Example 20 was charged at 4.2V of charging voltage, discharge capacity is smaller, compared with Example 20 where charging voltage was 4.4V. Further, with respect to the battery of Comparative Example 3, where neither the above-mentioned layered structure lithium manganese composite oxide nor the above-mentioned spinel lithium manganese composite oxide was employed for a positive electrode active material, problems of the battery were observed when being overcharged, and thus its safety is inferior.

Examples 21-27

Non-aqueous secondary batteries were obtained in the substantially same manner as Example 20, excepting that instead of employing propane sulfonate ethyl, butane sulfonic acid anhydride (Example 21), butane pentane sulfonic acid anhydride (Example 22), propane butane sulfonate methyl (Example 23), butane sulfonate methyl (Example 24), butane sulfonate ethyl (Example 25), pentane sulfonate methyl (Example 26) and hexane sulfonate ethyl (Example 27) were employed to prepare a non-aqueous electrolytic solution, respectively, so that each concentration of each additive is 0.5 mass % based on total mass of a non-aqueous electrolytic solution, and that the thus obtained non-aqueous electrolytic solution is employed. With respect to the properties in charging/discharging cycle property, storage property at high temperature and safety, the batteries of Examples 21-27 were evaluated. The results are shown in Table 6.

TABLE 6

|  | Additive | Retention of Capacity (%) | Swelling After Storage (mm) | Safety (Problem) |
| --- | --- | --- | --- | --- |
| Example 21 | butane sulfonate anhydride | 85 | 0.25 | Not observed |
| Example 22 | butane pentane sulfonate anhydride | 84 | 0.23 | Not observed |
| Example 23 | propane butane sulfonate methyl | 89 | 0.28 | Not observed |
| Example 24 | butane sulfonate methyl | 91 | 0.25 | Not observed |
| Example 25 | butane sulfonate ethyl | 88 | 0.26 | Not observed |
| Example 26 | pentane sulfonate methyl | 84 | 0.29 | Not observed |
| Example 27 | hexane sulfonate ethyl | 85 | 0.31 | Not observed |

From Table 6, it is realized that when the additives shown in Table 6 are added to a non-aqueous electrolytic solution, the battery has properties as good as a battery of Example 20, where a non-aqueous electrolytic solution containing a propane sulfonate ethyl was employed.

Examples 28-33 and Comparative Example 4

Non-aqueous secondary batteries were obtained in substantially the same manner as Example 24, excepting that vinylene carbonate was added to prepare a non-aqueous electrolytic solution, respectively, so that each concentration of vinylene carbonate was adjusted to the value (mass %) shown in Table 7, and that the thus obtained non-aqueous electrolytic solution was employed. With respect to the properties in charging/discharging cycle property, storage property at high temperature and safety, the batteries of Examples 28-33 and Comparative Example 3 were evaluated. The results are shown in Table 7. For explanation, the results of Example 24 are also shown in Table 7.

TABLE 7

|  | Content of vinylene carbonate (mass %) | Retention of capacity (%) | Swelling after storage (mm) | Safety (Problem) |
| --- | --- | --- | --- | --- |
| Comparative Example 4 | 0 | 54 | 0.47 | Not observed |
| Example 28 | 0.3 | 71 | 0.35 | Not observed |
| Example 29 | 0.5 | 82 | 0.31 | Not observed |
| Example 30 | 1 | 86 | 0.27 | Not observed |
| Example 24 | 2 | 91 | 0.25 | Not observed |
| Example 31 | 3 | 89 | 0.32 | Not observed |
| Example 32 | 5 | 74 | 0.37 | Not observed |
| Example 33 | 6 | 67 | 0.52 | Not observed |

From Table 7, when the content of vinylene carbonate in non-aqueous electrolytic solution in a battery is 0.2 mass % or more, the advantages of the battery of the present invention are observed more clear. It is also observed that when the content of vinylene carbonate in non-aqueous electrolytic solution is more than 5 mass %, a retention of capacity (charging/discharging cycle property) and swelling after storage (storage property at high temperature) tend to be lowered. From this fact, it is realized that the content of vinylene carbonate in non-aqueous electrolytic solution in a battery is preferably 0.2 mass % or more (more preferably 0.3 mass % or more, still more preferably 0.5 mass % or more), and preferably 5 mass % or less (more preferably 3 mass % or less) for more preferable results.

Examples 34-40 and Comparative Example 5

A non-aqueous secondary battery is obtained in substantially the same manner as Example 20, excepting that a mixture of $LiCoO_2$ containing 0.5 mol % of Zr as positive electrode active material and $LiMn_2O_4$ in a ratio of 50:50 (mass ratio) were used, and that instead of employing propane sulfonate ethyl, butane sulfonate methyl was employed to prepare a non-aqueous electrolytic solution, so that a content of butane sulfonate methyl was adjusted to value shown in Table 8 based on total mass of a non-aqueous electrolytic solution, and that the thus obtained non-aqueous electrolytic solution is employed. When these batteries were charged to 4.4V (electric potential of positive electrode is 4.5V with reference to a potential of Li), an electric capacity was designed to be 750 mAh.

TABLE 8

| | Content of Butane Sulfonate Methyl (mass %) | Retention of Capacity (%) | Swelling After Storage (mm) | Safety (Problem) |
|---|---|---|---|---|
| Comparative Example 5 | 0 | 51 | 0.82 | Not observed |
| Example 34 | 0.2 | 72 | 0.34 | Not observed |
| Example 35 | 0.5 | 85 | 0.28 | Not observed |
| Example 36 | 1 | 88 | 0.26 | Not observed |
| Example 37 | 2 | 86 | 0.27 | Not observed |
| Example 38 | 3 | 83 | 0.28 | Not observed |
| Example 39 | 5 | 76 | 0.27 | Not observed |
| Example 40 | 7 | 59 | 0.39 | Not observed |

From Table 8, when the content of sulfonate ester derivative (butane sulfonate methyl) contained in non-aqueous electrolytic solution in a battery is 0.2 mass % or more, the advantages of the battery of the present invention are observed more clearly. It is also observed that when the content of butane sulfonate methyl in non-aqueous electrolytic solution is more than 5 mass %, a retention of capacity (charging/discharging cycle property) and swelling after storage (storage property at high temperature) tend to be lowered. From this fact, it is realized that the content of sulfonate ester derivative contained in non-aqueous electrolytic solution in a battery is preferably 0.2 mass % or more (more preferably 0.5 mass % or more), and also preferably 5 mass % or less for more preferable results.

Exemplary embodiments of the present invention are described above. However, conditions and embodiments described in the examples are considered as illustrative to confirm enablement and the present invention is not restricted to these conditions. The invention can be applied in other various conditions without departing from the gist of the invention for accomplishing the object of the invention. The scope of the present invention should therefore be construed based on the claims. Applicants do not disclaim any embodiment encompassed by the claims and any equivalents thereof.

What is claimed is:

1. A non-aqueous secondary battery comprising:
a positive electrode;
a negative electrode;
a separator;
a non-aqueous electrolytic solution; and
a battery case, wherein
the positive electrode, the negative electrode, the separator and the non-aqueous electrolytic solution are contained in the battery case,
one case selected from the group consisting of a laminated case composed of a laminated film of aluminum and resin, a rectangular metal case and a cylindrical metal case is used for the battery case,
the negative electrode comprises as a negative electrode active material graphite having about 0.335 nm or more and 0.337 nm or less of interlayer distance $d_{002}$ of lattice plane (002),
the non-aqueous electrolytic solution contains at least one electrolyte salt selected from $LiPF_6$ and $LiBF_4$ and a cyclic sulfonate ester derivative expressed by the general formula (4),
the positive electrode comprises a layered lithium-containing compound oxide containing manganese as a positive electrode active material, and
a potential of the positive electrode is higher than 4.35 V and 4.6 V or less versus a Li reference electrode where the battery is charged up to a designed electric capacity:

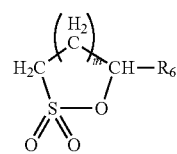

(4)

wherein $R_6$ in the general formula (4) represents independently hydrogen or an alkyl group having 1-4 of carbon atoms, which can have a fluorinated substituent, m is 0, 1 or 2.

2. The non-aqueous secondary battery according to claim 1, wherein the positive electrode, the negative electrode and the separator form a flat electrode assembly having a spiral structure, and the electrode assembly is fixed with an insulating tape and is contained in the rectangular metal case.

3. The non-aqueous secondary battery according to claim 1, wherein the non-aqueous electrolytic solution further contains vinylene carbonate or a derivative of the vinylene carbonate.

4. The non-aqueous secondary battery according to claim 1, wherein the positive electrode comprises a lithium-manganese-nickel-cobalt-containing compound oxide as the lithium-containing compound oxide.

5. The non-aqueous secondary battery according to claim 1, wherein the content of the cyclic sulfonate ester derivative is 0.2 mass % or more and 5 mass % or less of the non-aqueous electrolytic solution.

6. The non-aqueous secondary battery according to claim 1, wherein the content of the lithium-containing compound oxide is 10 mass % or more and 100 mass % or less of the entire positive electrode active material.

* * * * *